United States Patent Office 3,445,644
Patented May 20, 1969

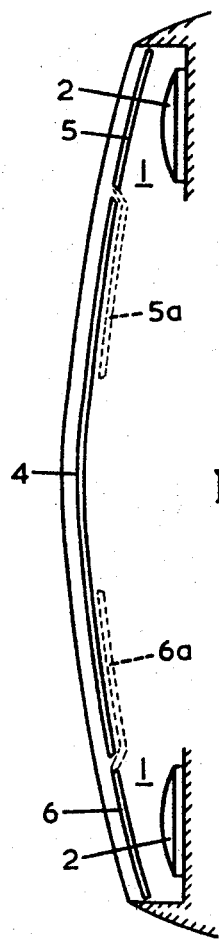
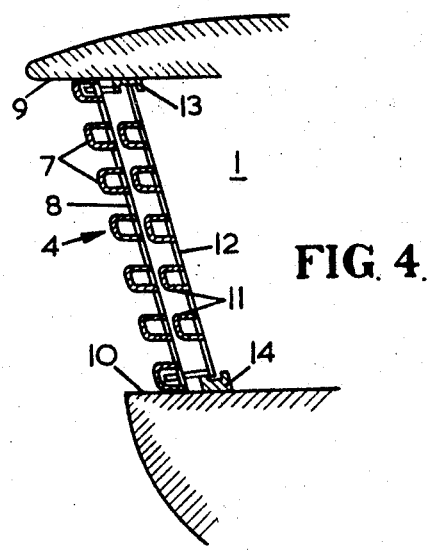
FIG. 3.
FIG. 4.
INVENTOR:-
GIOVANNI MICHELOTTI

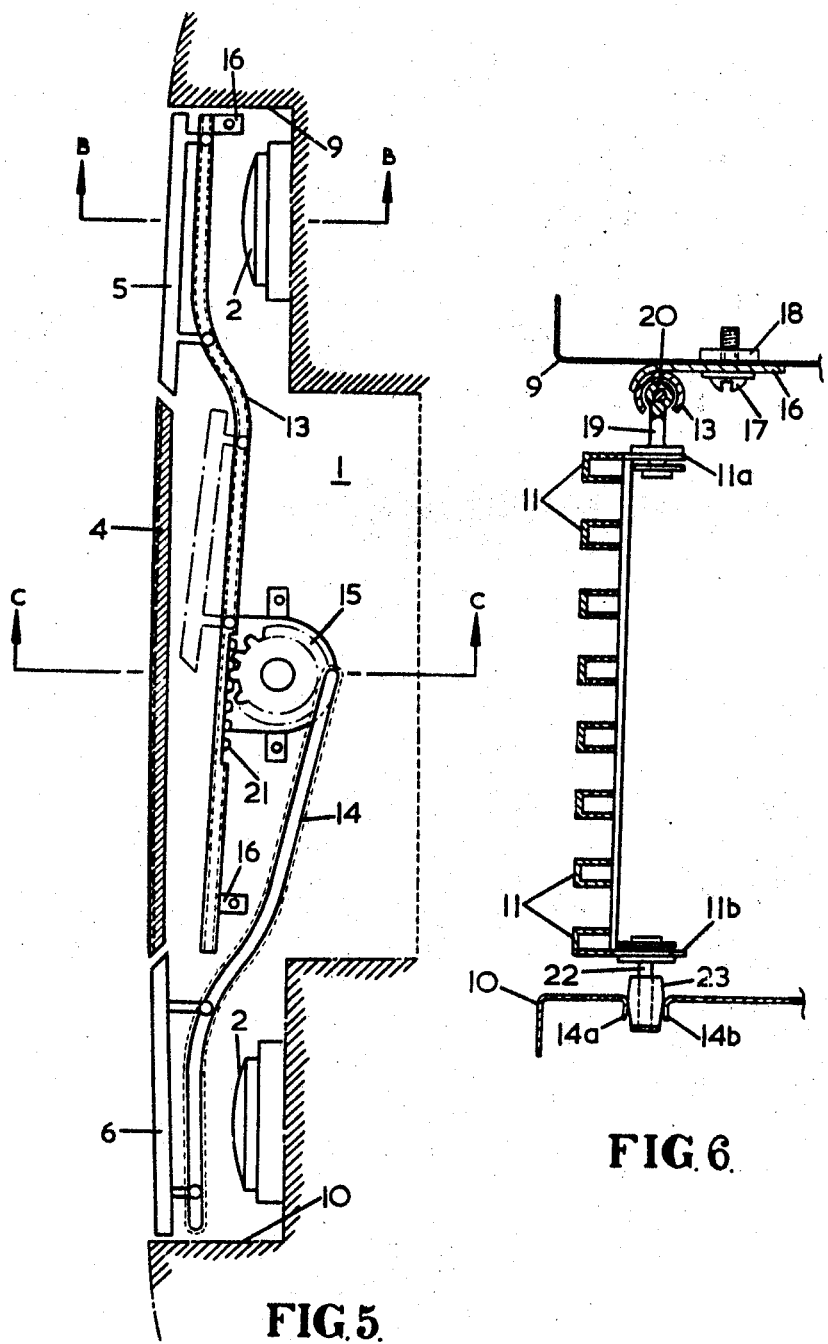

3,445,644
PROTECTIVE APPARATUS FOR MOTOR
VEHICLE HEADLAMPS
Giovanni Michelotti, Turin, Italy, assignor to The
Standard-Triumph Motor Company Limited,
Canley, England
Filed Feb. 13, 1967, Ser. No. 615,682
Claims priority, application Italy, Mar. 11, 1966,
5,778/66
Int. Cl. B60q 1/04
U.S. Cl. 240—7.1                7 Claims

ABSTRACT OF THE DISCLOSURE

Headlamps of a motor road vehicle are arranged behind a grille comprising a fixed central section and side sections which are slidable from a position in which they cover, and protect the headlamps from flying stones, to a position in which they uncover the headlamps for use.

---

The invention relates to apparatus for protecting the headlamps of motor vehicles.

The headlamp glasses of motor vehicles, particularly fast motor cars, are liable to be damaged by small stones thrown from the wheels of other vehicles. It has hitherto been proposed to avoid this by fixing protective grilles in front of them, but the presence of these fixed grilles reduce the efficiency of the headlamps when required for use. It has also been proposed to protect the glasses of the headlamps by mounting the latter so that they can be tilted and retracted into the vehicle body during daylight, but this solution is complicated and costly to carry out.

The object of the present invention is to provide a simple apparatus for protecting the headlamp glasses, with an avoidance of the disadvantages attaching to the said prior proposals.

According to the invention protective apparatus for motor vehicle headlamps comprises a frontal grille including a fixed central section between the headlamps and two end sections, the end sections being supported to be movable between extended positions in which they cover the headlamps, and retracted positions in which they lie at least partially behind the fixed central section and uncover the headlamps for use.

According to a further feature the end sections are supported by upper and lower stationary guides which constrain them to form a continuity of the central section when they are covering the headlamps, and to move behind the fixed central section when the headlamps are uncovered.

In such a case, and when the horizontal dimension of the fixed central section is at least equal to the sum of the horizontal dimensions of the end sections, the guides can be such as to constrain the end sections to lie end to end when behind the fixed central section.

According to another feature the end sections are made fast with cable means for moving them in each direction between their extended and retracted positions.

In such a case, and according to yet another feature, the cable means includes respective cables for the said end sections, and the separate cables are housed within part-tubular guides, from which connections from the cable means to the said end sections extend, and which are configured to direct the line of pull on the associated end sections to be along their respective stationary guides.

Also in such a case, and according to a still further feature, the cable means are connected to a driven member for moving the end sections in at least one direction; while according to an extension of this last-mentioned feature the cable means is connected to be acted upon by the driven member for moving the end sections in one direction against the influence of return-spring means, and the drive to the driven member includes a clutch which is disengageable for permitting the said end sections to be moved in the opposite direction by the said return-spring means. According to a still further extension the cable means includes a resiliently flexible, toothed cable for each shutter, and the toothed cables mesh diametrically opposite arcs of a coacting toothed wheel which acts as the driven member and is connected to be driven by a reversible motor.

In the accompanying drawings:

FIGURE 3 is a diagrammatic horizontal section corresponding with FIGURE 2;

FIGURE 4 is a diagrammatic vertical section corresponding with FIGURE 2;

FIGURE 5 is a composite sectional view taken mainly on the line A—A of FIGURE 1 and showing constructional features associated with FIGURE 3;

FIGURE 6 is a section on the line B—B of FIGURE 5; and

Referring firstly to FIGURES 1 to 4, the front of a motor car is provided with a transverse recess 1 in the ends of which are mounted the headlamps 2, which latter can be of the simple single type shown or of the double type. In the case where the motor car is provided with a rear engine the rear of the recess can be constituted by an imperforate plate, while where the motor car is provided with a front engine the rear of the recess can either be constituted by the radiator or by a perforated plate (not shown) giving access to cooling air for the radiator.

Figure 1:
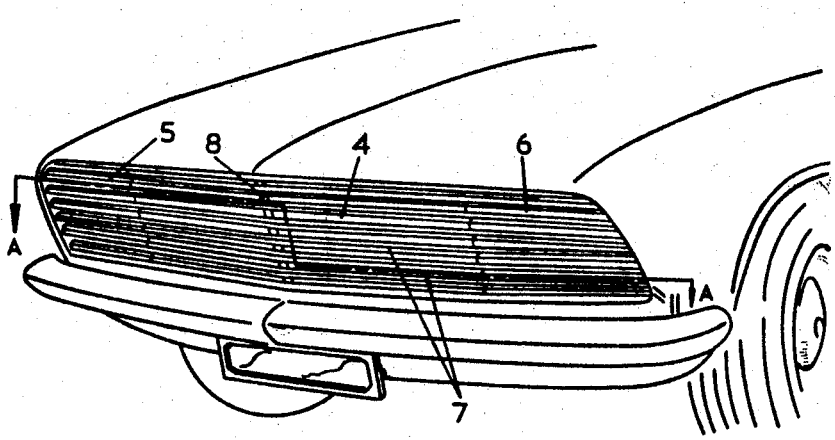
FIGURE 1 is a perspective view of the front of a motor car provided with one form of the protective apparatus of the invention, and showing the headlamps covered.
Figure 2:
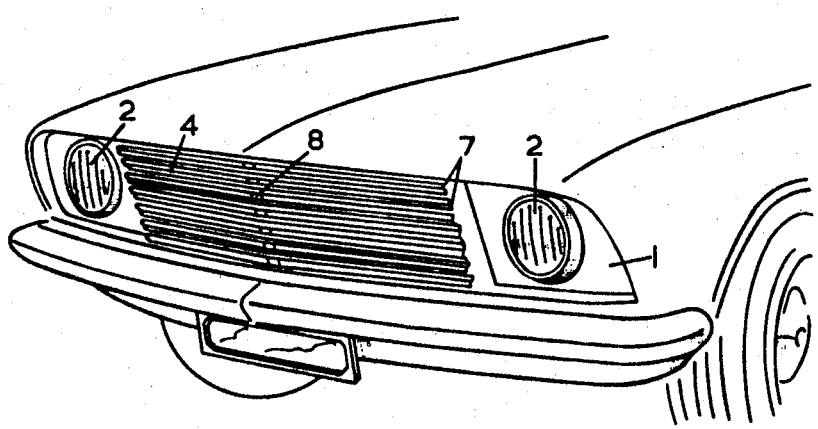
FIGURE 2 is a corresponding view but showing the headlamps uncovered.

The front of the recess is masked by a central grille consisting of a central section 4 which is fixed to surrounding structure, and two movable end sections 5 and 6 which can be moved between the position shown in FIGURE 1 in which they cover the headlamps, and the position shown in FIGURE 2 in which they have been moved behind the central section to uncover the headlamps for use.

End sections 5 and 5 of the frontal grille are guided for their above-stated movements, and are moved by any suitable means, for example by manually-operable mechanical apparatus, a fluid-operated motor or an electric motor, and these driving means may be situated remotely and be adapted to move the said end sections through a suitable transmission device such as a flexible cable. In FIGURE 3 end sections 5 and 6 are shown in full lines in the positions they occupy when shielding the headlamps, and in dotted lines at 5a and 6a when they have been moved to uncover the headlamps. It will be seen that sections 5 and 6 form continuations of section 4 when they are covering the headlamps, and that when the latter are uncovered the said end sections are arranged end to end behind section 4 as shown in both FIGURES 3 and 4.

FIGURE 4 indicates that the central grille section 4 is composed of vertically-spaced horizontal bars 7 substantially of U cross-section laid on one side, and that the lips of the U-section bars are made fast with one or more vertical supports 8 secured at their ends to upper and lower structure 9 and 10 respectively defining the roof and floor of recess 1. The same figure also indicates that the end grille sections 5 and 6 are of similar construction although section 5 is not shown. Thus, section 6 comprises vertically-spaced horizontal bars 11 which are of the same kind as bars 7 and are aligned with them, but in this case the vertical supports 12 for the bars 11 have their upper and lower ends arranged to coact with guides, indicated at 13 and 14, respectively supported from structure 9 and 10. These guides are for guiding the movement of the end sections 5 and 6, and are hereinafter described in greater detail.

Figure 7:
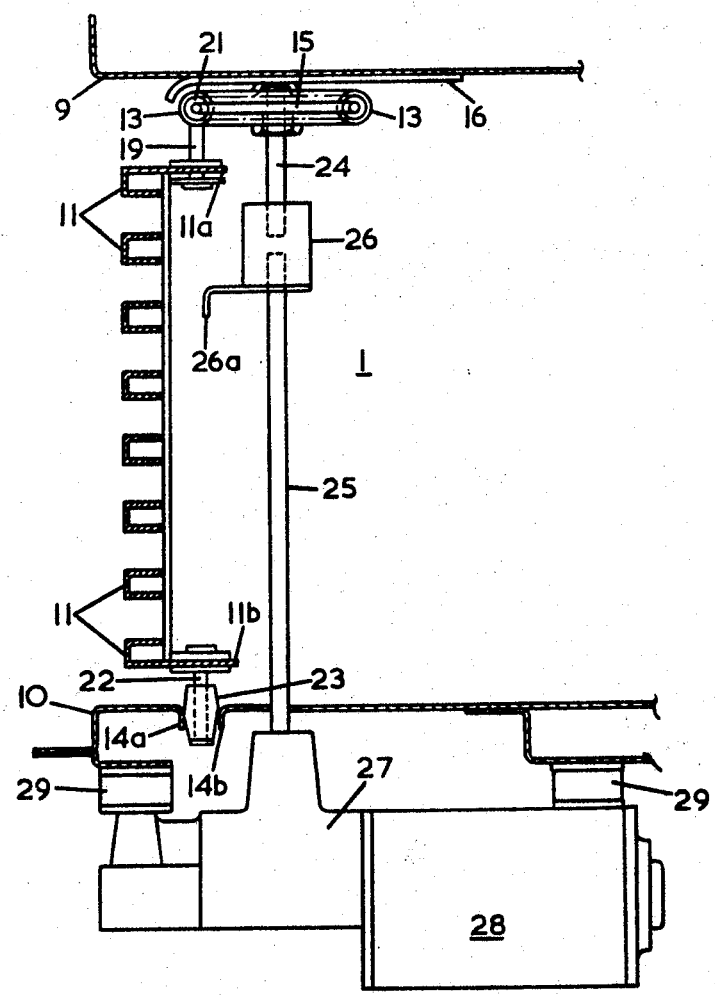
FIGURE 7 is a section on the line C—C of FIGURE 5, but omitting the central section of the frontal grille.

FIGURES 5, 6 and 7 illustrate a concrete embodiment of the invention which has just been described broadly with reference to FIGURES 1 to 4. In the said embodiment the end sections 5 and 6 are adapted to be moved between their limiting positions by a power-driven pinion 15 arranged in recess 1 centrally behind stationary grille section 4.

For ease of comprehension it is explained that above the section line C—C in FIGURE 5 is shown the upper guide 13 for grille end section 5, and that below that section line is shown the lower guide 14 for grille end section 6. Each upper guide 13 is in vertical alignment with its associated lower guide 14 as shown in FIGURE 6 and is of the same lengthwise contour, so that although one each of the guides 13 and 14 have been omitted from FIGURE 5 for clearness of illustration their position are manifest. The upper guide missing from FIGURE 5 is, however, shown in FIGURE 7.

The upper guides 13 are tubular with a longitudinal slit at the underside as shown in FIGURE 6, and each is supported, as by welding, from plates 16 attached by screws 17 engaged in captive nuts 18 fast with structure 9. Adjacent each end the uppermost bar 11 of each grille end section is provided with a rearwardly-extending flange 11a in which a vertical post 19 is supported. Each post 19 extends through the longitudinal slit and has a ball-end head 20 adapted to slide along the interior of the associated upper guide 13.

Within each uppper guide 13 is a resiliently-flexible toothed cable 21 having a portion of that end which is nearer the centre line of the motor car meshed by pinion 15 which extends through a slot in the side of the guide 13 for the purpose, and the outer end of the cable is made fast with either the nearer one of the ball-end heads 20 or both of them. It is arranged for the toothed cables to mesh diametrically opposite arcs of the pinion so that rotation of the latter will move the cables in opposite directions along their respective guides 13.

Also adjacent each end the lowermost bar 11 of each grille end section is provided with a rearwardly-extending flange 11b from which is supported a vertical stub shaft 22 on which is journalled, with end location, a roller 23. The stub shafts are aligned with the posts 19, and the rollers engage between lips 14a and 14b which are struck out of structure 10 and form the lower guides 14.

Pinion 15 is fast with a vertical shaft 24 which is connected to be driven from an aligned shaft 25 through a disengageable coupling device 26 presently to be described. Shaft 25, which extends through an opening in structure 10 as shown in FIGURE 7, is the output shaft of a speed-reduction gearing contained in a casing 27. The input shaft of the speed-reduction gearing is driven from a reversible electric motor 28 subject to remote control from the driver's position in the motor car. The gearing and motor are shown supported through resilient mountings 29, 29 from structure 10. Obviously, however, instead of the gearing and motor being mounted in the positions shown they could be mounted elsewhere and be connected to drive shaft 25 through a flexible shaft.

In operation, and starting from the position shown in FIGURE 5, energising electric motor 28 by appropriately actuating a control switch will cause pinion 15 to be driven counterclockwise to apply tension to both toothed cables 21. The latter thus draw grille end sections 5 and 6 to behind the centre section 4 into positions 5a and 6a to uncover the headlights. By reversely actuating the control past a neutral position pinion 15 is caused to be driven in the clockwise direction to urge toothed cables 21 outwardly along the guides 13 to reposition the grille end sections 5 and 6 in the position in which they mask the headlights.

The disengageable coupling device 26 is operable by a lever 26a to disconnect the drive transmission between shafts 24 and 25 so that the grille end sections 5 and 6 can be freely slid by hand when, for example, cleaning the motor car when stationary.

What I claim as my invention and desire to secure by Letters Patent of the United States is:

1. Protective apparatus for motor vehicle headlamps, comprising a frontal grille including a fixed central section between the headlamps and two end sections, and means supporting said end sections for sliding movement between extended positions in which they cover the headlamps and retracted positions in which they are at least partially overlapped by the fixed central section and uncover the headlamps for use.

2. Apparatus, according to claim 1, in which the end sections are supported by upper and lower stationary guides which constrain them to form a continuity of the central section when they are covering the headlamps, and to move behind the fixed central section when the headlamps are uncovered.

3. Apparatus, according to claim 2 and in the case where the horizontal dimension of the fixed central section is at least equal to the sum of the horizontal dimensions of the end sections, in which the guides constrain the end sections to lies end to end when behind the fixed central section.

4. Apparatus, according to claim 1, in which the end sections are made fast with cable means for sliding them in each direction between their extended and retracted positions.

5. Apparatus, according to claim 4, in which the cable means includes respective cables for the said end sections, and the separate cables are housed within part-tubular guides, from which connections from the cable means to the said end sections extend, and which are configured to direct the line of pull on the associated end sections to be slid along their respective stationary guides.

6. Apparatus, according to claim 1, in which the end sections are made fast with cable means for sliding them in at least one direction, and the cable means are connected to a driven member for sliding the end sections.

7. Apparatus, according to claim 6, in which the cable means includes a resiliently flexible, toothed cable for each shutter, and the toothed cables mesh diametrically opposite arcs of a coacting toothed wheel which acts as the driven member and is connected to be driven by a reversible motor.

References Cited
UNITED STATES PATENTS 3,070,687 12/1962 Marchant _____ 240—7.1
3,310,669 3/1967 Dils _____ 240—46.07 XR NORTON ANSHER, *Primary Examiner.*

WAYNE A. SILVERTSON, *Assistant Examiner.*

U.S. Cl. X.R.

240—46.03, 102